United States Patent Office 3,652,711
Patented Mar. 28, 1972

3,652,711
METHOD OF POLYMERIZING SILOXANES
Hermann Triem, Wissenbach, Manfred Wick, Munich, and Siegfried Nitzsche and Karl-Heinrich Wegehaupt, Burghausen, Upper Bavaria, Germany, assignors to Wacker-Chemie G.m.b.H., Munich, Germany
No Drawing. Filed Mar. 18, 1969, Ser. No. 808,324
Claims priority, application Germany, Mar. 18, 1968, P 17 45 572.0
Int. Cl. C08g 47/02, 47/06
U.S. Cl. 260—825
6 Claims

ABSTRACT OF THE DISCLOSURE

High polymeric gum-like copolymers of dimethylsiloxane and methylvinylsiloxane are prepared by (1) preparation of a copolymer of 75 to 90 mol percent dimethylsiloxane units and 10 to 25 mol percent methylvinylsiloxane units and (2) equilibration of the copolymer so obtained with dimethylsiloxane.

---

The invention relates to a method of preparing high molecular weight copolymers of dimethylsiloxane and methylvinylsiloxane units as well as other siloxane units, if desired, from which organopolysiloxane elastomers are prepared by known methods and procedures.

It is known that organopolysiloxane elastomers may be prepared from materials which contain as the principal component high molecular weight copolymers of dimethylsiloxane and methylvinylsiloxane units as well as other siloxane units, if desired. High molecular weight copolymers of dimethylsiloxane and methylvinylsiloxane units have hitherto been prepared by cohydrolysis of very large quantities of hydrolyzable dimethylsilane, especially dimethyldichlorosilane, and very small quantities of hydrolyzable methylvinylsilane, especially methylvinyldichlorosilane, and a final further polymerization of the cohydrolyzate, or by so-called equilibration, that is, copolymerization of dimethylpolysiloxanes and methylvinylpolysiloxanes, which include primarily cyclic polysiloxanes.

The commonly used cohydrolysis of dimethyldichlorosilane and methylvinyldichlorosilane has the disadvantage that a great expenditure of time and effort is required to neutralize the hydrochloric acid formed as the by-product of the hydrolysis which can split off or cleave a portion of the vinyl groups. Even more undesirable is the expense for apparatus and/or personnel required for such a cohydrolysis, because in addition to copolymers of dimethylsiloxane and methylvinylsiloxane units with an equal average ratio of the various siloxane units are prepared in a manufacturing plant but also, viz, copolymers of dimethylsiloxane and methylvinylsiloxane units with various average ratios of the various siloxane units, copolymers of dimethylsiloxane units and other siloxane units than methylvinylsiloxane units with various average ratios of the different siloxane units as well as homopolymers, especially dimethylpolysiloxanes are prepared in the same equipment.

The above disadvantages of the commonly practiced cohydrolysis, especially its lack in flexibility, are not encountered with equilibration processes. Previously known methods of preparing high molecular weight copolymers from dimethylsiloxane and methylvinylsiloxane units by equilibrating will, however, give products which will result in elastomers having considerably poorer mechanical properties, for instance, considerably lower Shore hardness and considerably lower elasticity than elastomers from copolymers of dimethylsiloxane and methylvinylsiloxane units having equal average ratios of the various siloxane units prepared by cohydrolysis.

The object of this invention is to introduce a novel method for preparing high molecular weight copolymers of dimethylsiloxane and methylvinylsiloxane units. A further object is a method of copolymerizing dimethylsiloxane and methylvinylsiloxane avoiding the difficulties and disadvantages encountered in the presently known methods. An economically sound method for preparing gum-like copolymers of methylvinylsiloxane and dimethylsiloxane useful for preparation of excellent high strength silicone rubber is also sought. Other objects and advantages of this invention are detailed in or will be apparent from the disclosure and claims which follow.

The subject of the invention is a method of preparing high molecular weight copolymers by (1) preparing copolymers of 75 to 90 mol percent dimethylsiloxane and 25 to 10 mol percent methylvinylsiloxane units and other organopolysiloxanes, if desired, followed by (2) equilibration of the copolymer from step (1) with a dimethylpolysiloxane.

Preferably, the copolymers incorporated with the dimethylpolysiloxanes during the equilibration step (2) consists of about 80 mol percent dimethylsiloxane and 20 mol percent methylvinylsiloxane units.

The copolymers of dimethylsiloxane and methylvinylsiloxane units incorporated during the equilibration step (2) can be linear or cyclic or a mixture thereof.

The step (1) preparation of the copolymers consisting of dimethylsiloxane and methylvinylsiloxane units incorporated during the equilibration step (2) within the framework of the present invention can be accomplished by cohydrolysis or a similar process. During the cohydrolysis, however, considerably smaller and therefore fewer pieces of apparatus are required and considerably smaller quantities of material are to be processed than if the quantity of hydrolyzable dimethylsilane corresponding to the total quantity of dimethylsiloxane units in the ultimate high molecular weight copolymer used hitherto for the preparation of the elastomer were hydrolyzed together with a hydrolyzable methylvinylsilane. The preparation of the copolymers incorporated during the equilibration within the framework of the present invention, preferably takes place by avoiding the damaging effects of acid on the vinyl groups in the known manner. Thus, if the step (1) preparation of the copolymers used for the equilibration step (2) within the framework of the present invention is accomplished by hydrolysis of a mixture of dimethyldichlorosilane and methylvinyldichlorosilane with water, ethylene oxide, for example, or another neutralizing material for the by-produced hydrochloric acid should be present in sufficient amount to neutralize the HCl produced. This can be determined from the amount of chlorine in the silanes employed. Especially good results, however, are obtained with copolymers which were prepared by adding the mixtures of dimethyldichlorosilane and methylvinyldichlorosilane wherein about 0.10 to 0.33 mol, preferably about 0.25 mol of methylvinyldichlorosilane per mol of dimethyldichlorosilane are present to at least 1 mol of sodium bicarbonate ($NaHCO_3$) or ammonium bicarbonate ($NH_4HCO_3$) per mol of Si-bonded chlorine using dry methylenechloride as the reaction medium at a temperature beneath the boiling point of methylenechloride, especially at room temperature, that is, at about 25° C.

The copolymers of dimethylsiloxane and methylvinylsiloxane units are incorporated during the equilibration step (2) preferably in such quantities that one vinyl group is present per 100 to 1400 silicon atoms present in the total organopolysiloxanes which are to be equilibrated.

The dimethylpolysiloxanes which are to be incorporated within the framework of the present invention during the equilibration may be linear or cyclic. Up to 5 mol percent of the dimethylsiloxane units in these dimethylpolysiloxanes can be replaced by other polymer units present as practically unavoidable contaminations, especially monomethylsiloxane units and/or $SiO_{4/2}$ units. The dimethylpolysiloxanes incorporated during the equilibration step (2) within the framework of the present invention include preferably those which are obtained by acid hydrolysis of dimethyldichlorosilane, that is, by reaction of dimethyldichlorosilane with water in the absence of neutralization agents for the hydrochloric acid formed as a by-product because of their ready availability. These dimethylpolysiloxanes generally have a viscosity below 10,000 cs./25° C., especially below 1,000 cs./25° C. Particularly preferred are linear dimethylpolysiloxanes containing 1 Si-bonded hydroxyl group in the terminal units (i.e., $HO\{(CH_3)_2SiO\}_xH$ where $x$ is an integer).

To introduce the other siloxane units which can be present in addition to the dimethylsiloxane and methylvinylsiloxane units in high molecular organopolysiloxanes used for the organopolysiloxane elastomer preparation, other organopolysiloxanes containing at least 1 of the named siloxane units can also be used during the equilibration. The siloxane units include especially those of the general formula

In this formula $n$ is 2 or 3 and each R is hydrogen, a monovalent hydrocarbon radical or a monovalent substituted hydrocarbon radical. Obviously in these optional siloxanes at least some of the units must be such that at least one R is other than methyl or vinyl, when $n$ has a value of 2. Examples for hydrocarbon radicals R are in addition to methyl and vinyl radicals, alkyl radicals such as ethyl radicals, alkenyl radicals such as the allyl radical, aryl radicals such as the phenyl radical. Examples of substituted hydrocarbon radicals are 3,3,3-trifluoropropyl radicals, halogen aryl radicals and cyanoalkyl radicals. Examples for organopolysiloxanes which can also be employed for the equilibration within the framework of the method of the present invention are trimethylsiloxane endblocked dimethylpolysiloxanes, sym.-tetramethyldivinyldisiloxane and copolymers of dimethylsiloxane and methylphenylsiloxane units.

The equilibration can be carried out according to any known method for equilibrating organopolysiloxanes employing known equilibration catalysts such as sulfuric acid and alkali metal hydroxides. Because the equilibration runs off especially smoothly and gives especially good results, the equilibration catalysts of phosphoronitrile halides or optionally nitrogen-bonded substituted amide halides of phosphorous acid or phosphoric acid which are known to catalyze the polymerization and re-arrangement from German Pat. 930,481 are preferred. Because of the ready availability and the excellent results obtained, the phosphoronitrilechlorides, especially polymeric products, which are obtainable by reacting phosphoropentachloride with ammonium chloride according to "Berichte der deutschen Chemischen Gesellschaft," volume 57 (1924), pages 1345/1346, or "Journal of the Chemical Society" (1960), pages 2542 to 2547 are preferred from among the phosphorous compounds given above. They correspond to the formula $(PNCl_2)_m$, wherein $m$ is a whole number of 3 to 6.

The equilibration catalysts are preferably used in quantities of 0.01 to 1 percent by weight, especially 0.02 percent by weight, always calculated on the total weight of the organopolysiloxanes. However, larger or smaller quantities can be used.

For better distribution in the organopolysiloxanes to be equilibrated and for simpler dosage, the equilibration catalysts are used in the form of their solutions in inert solvents, i.e., those which do not react with the catalysts and the organopolysiloxanes at the temperature used for the equilibration. Expediently, these solutions contain 20 to 60 percent by weight of the equilibration catalysts. Examples for suitable solvents are hydrocarbons such as benzene, toluene, xylene and petroleum ether; halogenhydrocarbons such as methylenechloride, perchloroethylene and chlorobenzene; ethers such as diethylether and di-n-butylether; as well as ketones such as methylisobutylketone.

The equilibration preferably takes place at 0° to 110° C. especially at room temperature. The pressure applied for this is generally atmospheric pressure, i.e., about 760 mm. Hg (absolute). The water which is formed during equilibration by condensation of Si-bonded hydroxy groups can be removed by conducting air or nitrogen through the reaction mixture. The equilibration generally lasts four to eight hours. If desired, the equilibration can be carried out in an inert solvent, for instance, one of the above solvents.

The high molecular weight copolymers which are obtained during this equilibration can be cross-linked to form elastomers in any manner which is common for the preparation of organopolysiloxane elastomers. Preferably, the cross-linking is done by heat-activated organic peroxidic compounds such as benzoyl peroxide, bis-dichlorobenzoylperoxide, dicumylperoxide and/or tertiary-butylperbenzoate. If desired, other heat activated cross-linking materials can be used such as azodiisobutyrodinitrile or sulfur, if desired, in a mixture with organic sulfur compounds, such as tetramethylthiuramdisulfide, or other vulcanizing agents based on sulfur. Cross-linkers which will work at room temperature can also be used. Examples of room temperature activated cross-linkers are combinations of (A) silicic acid esters such as ethylorthosilicate, polysilicic acid esters such as ethylpolysilicate, organoalkoxy silanes such as methyltrimethoxysilane, polymers of such silanes such as partial hydrolyzates of methyltrimethoxysilane, organopolysiloxanes having at least 3 Si-bonded hydrogen atoms per molecule such as methyl hydrogen polysiloxanes together with (B) salts of carboxylic acids and metals or organo metals such as lead-2-ethylhexoate ad dibutyltindilaurate. Further examples for room temperature activated cross-linkers are organotriacyloxysilanes such as methyltriacetoxysilane, amino-substituted silicon compounds displaying at least 3 hydrolyzable groups per molecule such as methyltris-(cyclohexylamino)-silane, if desired, also in combination with condensation catalysts, for instance, the above salts, organopolysiloxanes, displaying at least 3 Si-bonded hydrogen atoms per molecule such as the methyl hydrogen polysiloxanes in combination with platinum catalysts, for instance, those of the formulae $PtCl_4$, $H_2PtCl_6$ and $PtO_2$, may also be used as cross-linkers. If desired, the cross-linking of the copolymers obtained during the equilibration can also be carried out by ionizing radiation, for instance, alpha-, beta-, gamma-, or X-rays.

The materials which are concurrently used for the preparation of organopolysiloxane elastomers in addition to high molecular organopolysiloxanes and curing agents can also be used within the framework of the method of the present invention for preparing elastomers. Examples of such materials are primarily active and non-active fillers, additives for reducing rigidity (described also as "structure formation" or "crepe aging ") such as organosilanols and low molecular organopolysiloxanes with hydroxyl groups, additives for reducing permanent deformation, pigments, soluble dyes, oxidation inhibitors, heat stabilizers, flame inhibitors, light protectants, softeners such as fluid trimethylsiloxy end-blocked dimethylpolysiloxane, as well as materials which will affect the electrical properties of elastomers in any desired manner such as conductive carbon.

Examples for active (also designated as "reinforcing") fillers, that is, of fillers with the surface of more than 50 m.²/g., include silica obtained pyrogenically in the gas phase, silicic acid hydrogels dehydrated while maintaining the structure, that is, the so-called silica aerogels, or precipitated silica with a large surface. These fillers can carry organosiloxy or alkoxy groups at their surface, if desired; examples for non-active (also designated as "non-reinforcing") fillers, that is, fillers with the surface of less than 50 m.²/g., are diatomaceous earth and quartz flour, metal powders such as aluminum powder, as well as powders of metal oxides and metal silicates such as titanium dioxide and aluminum oxide, with a surface of less than 50 m.²/g. Fibrous fillers such as asbestos can also be used.

The organopolysiloxane elastomers prepared according to the invention can, for instance, be used wherever organopolysiloxane elastomers had previously been incorporated, for example, for preparing tubes, seals or electrical insulations.

The following examples are intended to assist in understanding the invention and do not define the scope of the invention.

PREPARATION OF THE STARTING PRODUCTS (I) The phosphoronitrilechloride which was used in the following examples and in the comparative tests was prepared according to "Berichte der deutschen Chemischen Gesellschaft," volume 57 (1924), page 1345, by heating 400 g. phosphoropentachloride with 130 g. ammonium chloride in 1,000 ml. tetrachloroethylene to 135° C. until gas development had stopped and this solvent was then distilled off. From the residue which was obtained by distilling off the solvent, a 30 percent by weight solution was prepared by dissolving with methylenechloride.

(II) The copolymer of dimethylsiloxane and methylvinylsiloxane units incorporated during equilibration in the following examples was prepared in the following manner: a mixture of 528 g. methylvinyldichlorosilane and 1,935 g. dimethyldichlorosilane was added at room temperature while stirring to a slurry of 3,300 g. sodium bicarbonate in 3,000 ml. methylenechloride dried over calcium chloride. After the development of gas had stopped, it was filtered from the precipitated sodium chloride and unreacted sodium bicarbonate and the filtrate was freed from methylenechloride at an ambient temperature of the flask of 20° C. by applying vacuum of about 1 mm. Hg (abs.). The residue weighed 719 g. and was a copolymer of 80 mol percent dimethylsiloxane and 20 mol percent methylvinylsiloxane units, with a viscosity of 85 cs./25° C. and 3.7 percent by weight Si-bonded hydroxyl groups.

EXAMPLE 1

(a) A mixture of 1,000 g. of dimethylpolysiloxane prepared by acid hydrolysis of dimethyldichlorosilane, having a viscosity of 287 cs./25° C., 5.2 g. of the copolymer whose preparation was described under (II) above and 0.2 ml. of the 30 percent by weight solution of phosphoronitrilechloride was stirred for 5 hours at 25° C., while nitrogen was conducted through the mixture. A copolymer (A) containing one vinyl group per 1,000 silicon atoms was obtained having an average molecular weight of one to two million.

(b) The procedure described under (a) above was repeated with the alteration that not 5.2 g. but 7.4 g. of the copolymer prepared as described under (II) was used. A copolymer (B) containing one vinyl group per 750 silicon atoms approximately and having an average molecular weight of one to two million was obtained.

(c) The procedure described under (a) above was repeated with the alteration that not 5.2 g. but 10.5 g. of the copolymer prepared as described under (II) was used. A copolymer (C) containing one vinyl group per approximately 500 silicon atoms with an average molecular weight of one to two mililon was obtained.

Comparison test A (cohydrolysis)

($a_1$) 200 ml. of water was added dropwise to a mixture of 1,290 g. dimethyldichlorosilane and 1.41 g. of methylvinyldichlorosilane at room temperature while stirring. The precipitated oily fluid was dissolved in an equal volume quantity of toluene and washed with diluted ammonia and water until a pH of about 7.0 was obtained. After distilling off the toluene at atmospheric pressure, the hydrolyzate was freed of volatile organopolysiloxane at about 1 mm. Hg absolute and an external temperature of the flask of 120° C.

A mixture of 500 g. of the hydrolyzate thus purified and 0.1 ml. of the 30 weight percent solution of phosphoronitrilechlorides was stirred for 5 hours at 25° C. and nitrogen was conducted through the mixture. A copolymerizate ($a_1$) containing one vinyl group per 1,000 silicon atoms with an average molecular weight of one to two million was obtained.

($a_2$) The procedure described above under ($a_1$) was repeated with the alteration that not 1.41 g. but 1.88 g. of methylvinyldichlorosilane was used. A copolymer ($a_2$) containing one vinyl group per about 750 silicon atoms having an average molecular weight of one to two million was obtained.

($a_3$) The procedure described above under ($a_1$) was repeated with the alteration that not 1.41 g. but 2.82 g. of methylvinyldichlorosilane was used. A copolymer ($a_3$) having one vinyl group per about 500 silicon atoms and an average molecular weight of one to two million was obtained.

Comparison Test B (equilibration not according to the present invention)

($\alpha$) 500 ml. of water was added dropwise to 2,000 g. of dimethyldichlorosilane at room temperature while stirring. The precipitated oily fluid was dissolved in an equal volume quantity of toluene and washed with diluted ammonia and water until the solution had a pH value of about 7.0. After distilling off the toluene at atmospheric pressure, the hydrolyzate was freed of volatile organopolysiloxanes at about 1 mm. Hg absolute and an external temperature of the flask of 120° C.

($\beta$) The above procedure described under ($\alpha$) was repeated with the alteration that instead of 2,000 g. dimethyldichlorosilane, 200 g. of methylvinyldichlorosilane and not 500 ml. of water but 50 ml. of water were used.

($b_1$) A mixture of 740 g. of the dimethylpolysiloxane, prepared as described above under ($\alpha$), 0.86 g. of the methylvinylpolysiloxane, prepared as described above under ($\beta$) and 0.15 ml. of the 30 percent by weight solution of phosphoronitrilechloride was stirred for 5 hours at 25° C. and nitrogen was conducted through the mixture. A copolymer ($b_1$) containing about one vinyl group per about 1,000 silicon atoms and having an average molecular weight of one to two million is obtained.

($b_2$) The procedure described under ($b_1$) was repeated with the alteration that not 0.86 g. but 1.145 g. of the methylvinylpolysiloxane prepared as described under ($\beta$) was used. A copolymer ($b_2$) which contained one vinyl group per about 750 silicon atoms with an average molecular weight of one to two million was obtained.

($b_3$) The procedure described under ($b_1$) above was repeated with the alteration that not 0.86 but 1.92 g. of the methylvinylpolysiloxane prepared as described above under ($\beta$) was used. A copolymer ($b_3$) containing one vinyl group per about 500 silicon atoms having an average molecular weight of 1 to 2 million was obtained.

Silicone rubber stocks were prepared by mixing 100 parts each of the high molecular copolymers A to ($b_3$) with 7 parts by weight of a siloxane having 5 percent by weight Si-bonded hydroxyl groups (prepared from phenylmethyldichlorosilane analogously as described under (II) above but with an external cooling to −10° C.).

40 parts by weight of fume silica, and 1.2 parts by weight of a paste of equal parts by weight bis-2,4-dichlorobenzoylperoxide and a trimethylsiloxy end-blocked dimethylpolysiloxane having a viscosity of 250 cs./25° C.

From these stocks, elastomers were prepared in the form of sheets by heating for 10 minutes at 135° C. at a pressure of 75 kg./cm.² whereby the organopolysiloxanes were vulcanized or cross-linked. The rubber sheets thus obtained were cured by heating in a circulating air oven for 12 hours at 150° C. and 12 hours at 200° C. The rubber sheets possess the following properties regarding Shore hardness A determined by German Industrial Standard (DIN) 53,505, regarding reflex elasticity determined according to German Industrial Standard (DIN) 53,512 and regarding permanent deformation expressed by the residual pressure deformation in percent (22 hours at 174° C.), determined by German Industrial Standard (DIN) 53,517:

TABLE

| | 1 vinyl group per about— | | | | | | | | |
|---|---|---|---|---|---|---|---|---|---|
| | 1,000 Si-atoms copolymer | | | 750 Si-atoms copolymer | | | 500 Si-atoms copolymer | | |
| | A | $a_1$ | $b_1$ | B | $a_2$ | $b_2$ | C | $a_3$ | $b_3$ |
| Shore hardness | 60 | 55 | 40 | 65 | 58 | 45 | 68 | 60 | 50 |
| Reflex elasticity, percent | 39 | 35 | 18 | 40 | 38 | 21 | 43 | 42 | 30 |
| Residual permanent deformation, percent | 25 | 28 | 35 | 22 | 26 | 32 | 20 | 24 | 30 |

EXAMPLE 2

A mixture of 1,000 g. of a dimethylpolysiloxane, prepared by acid hydrolysis of dimethyldichlorosilane, having a viscosity of 287 cs./25° C., 10.5 g. of a copylmer of dimethylsiloxane and methylvinylsiloxane units prepared as described under (II) above, 1.0 g. of the organopolysiloxane of the formula

$(CH_3)_3Si\{OSi(CH_3)_2\}_{10}OSi(CH_3)_3$ and 0.2 ml. of the 30 percent by weight solution of phosphoronitrilechlorides was stirred for 5 hours at 25° C. and nitrogen was conducted through the mixture. From the copolymer thus obtained which displayed an average molecular weight of 1 million, an elastomer was prepared according to the procedure described in Example 1. It had excellent properties.

EXAMPLE 3

The procedure described in Example 2 was repeated with the alteration that instead of 1.0 g. of a trimethylsiloxy end-blocked dimethylpolysiloxane, 0.48 g. of symm.-tetramethyldivinyldisiloxane was used. From the copolymer obtained by equilibration, having an average molecular weight of 600,000, an elastomer was prepared according to the procedure described in Example 1. It had excellent properties.

EXAMPLE 4

A mixture of 629 g. of a dimethylpolysiloxane, prepared by acid hydrolysis of dimethyldichlorosilane, having a viscosity of 287 cs./25° C., 302 g. of a copolymer of 80 mol percent dimethylsiloxane and 20 mol percent methylphenylsiloxane units, 6.5 g. of the copolymer of dimethylsiloxane and methylvinylsiloxane units prepared as described above under (II), 400 ml. benzene and 0.4 ml. of the 30 weight percent solution was stirred for six hours at 100° C. and nitrogen was conducted through the mixture. From the copolymer obtained by equilibration, which had an average molecular weight of one to two million, an elastomer was prepared by the procedure described in Example 1. It had excellent properties.

That which is claimed is:

1. A method for preparing high molecular weight copolymers suitable for use in silicone rubber stocks comprising the steps (1) preparation of a copolymer consisting essentially of 80 to 90 mol percent dimethylsiloxane units and 10 to 20 mol percent of methylvinylsiloxane units by cohydrolysis and condensation of a mixture of dimethyldichlorosilane and methylvinyldichlorosilane in the presence of a hydrogen halide acceptor whereby the hydrolysis medium is maintained in an essentially neutral state and (2) equilibration of the copolymer from (1) with a low molecular weight dimethylpolysiloxane, the proportions of copolymer of methylvinylsiloxane units and dimethylsiloxane units and low molecular weight dimethylpolysiloxane in equilibration step (2) being such as to provide a vinyl substituent to silicon atom ratio of from 1/100 to 1/1400 in the organopolysiloxane mixture.

2. The method of claim 1 wherein the step (1) is carried forward in a slurry of ammonium bicarbonate, sodium carbonate or sodium bicarbonate in methylenechloride.

3. The method of claim 1 wherein step (2), the equilibration reaction, is carried forward in the presence of a catalytic proportion of phosphoronitrilechloride.

4. The method of claim 1 wherein the dimethylpolysiloxane in step (2) is a hydroxyl end-blocked, linear dimethylpolysiloxane.

5. The method of claim 1 wherein the copolymer prepared in step (1) contains about 80 mol percent dimethylsiloxane units and about 20 mol percent methylvinylsiloxane units.

6. The method of claim 2 wherein step (2), the equilibration reaction, is carried forward in the presence of a catalytic proportion of phosphoronitrilechloride.

References Cited

UNITED STATES PATENTS

| 2,975,202 | 3/1961 | Mixer | 260—46.5 |
| 3,183,205 | 5/1965 | Bailey et al. | 260—46.5 |
| 3,186,967 | 6/1965 | Nitzsche et al. | 260—46.5 |
| 3,223,474 | 12/1965 | Nitzsche et al. | 260—448.2 |
| 3,464,950 | 9/1969 | Wegehaupt et al. | 260—46.5 |

OTHER REFERENCES

Pines et al.: German application 1,060,862, printed July 9, 1959.

SAMUEL H. BLECH, Primary Examiner

U.S. Cl. X.R.

204—159.13; 260—18 S, 37 SB, 46.5 G, 46.5 U, 448.2 U